United States Patent Office 3,723,361
Patented Mar. 27, 1973

3,723,361
CYANO-SUBSTITUTED POLYEPOXIDES
Herbert A. Newey, Lafayette, and Howard V. Holler, Oakland, Calif., assignors to Shell Oil Company, New York, N.Y.
No Drawing. Filed Sept. 24, 1970, Ser. No. 75,253
Int. Cl. C08g 30/02, 30/04, 30/08
U.S. Cl. 260—2 EP                           14 Claims

ABSTRACT OF THE DISCLOSURE

Novel cyano- and epoxide-containing resins having at least two epoxide groups and at least one cyano group per molecule are described. These novel resin may be cured with epoxy curing agents to produce hard, flexible, insoluble compositions which are especially siutable as molding compounds, coatings and adhesives.

BACKGROUND OF THE INVENTION

This invention is concerned with epoxy-containing resins. More particularly, it is directed to new and valuable epoxy resins that have cyano groups as part of their structure. It is also concerned with the preparation of such resins and with polymers made therefrom by heating and reacting them with epoxy curing agents.

Cured epoxy resins meet the needs for thermosetting resins in many industrial applications. Epoxy resins made from Bisphenol A (2,2 - bis(4-hydroxyphenyl) propane) and epichlorohydrin are widely used in various physical forms, molecular weights and degrees of purity. Other epoxy resins are made by reacting epichlorohydrin with phenols, amines, cyanurates, melamines, disiloxanes and other compounds, and by reacting peracetic acid or hypochlorous acid with compounds containing olefinic unsaturation, as described in Lee and Neville's, "Handbook of Epoxy Resins," and elsewhere.

The commercial resins are usually liquid or low melting solids that form low viscosity, easy to process systems. When cured by heat, these resins have a unique combination of properties, including low shrinkage, high adhesive strength, excellent mechanical properties, high electrical insulation characteristics, good chemical resistance and versatility achievable by blending resin types, by selection of curing agents and by use of modifiers and fillers.

Solid epoxy resins are used in solution, both with and without prior reaction with drying oils and other resin-forming compounds, wherein the epoxy resin imparts toughness, scuff resistance and chemical resistance to the cured products formed therefrom. The epoxy resins find their main applications in adhesives, in body solder and caulking compounds, in castings to make molds, dies and patterns, in special road surfaces, in potting and encapsulation compounds and in laminating resins for airframe and missile applications.

In many of these applications, commercial epoxy resins are used, but epoxy resins of superior properties would be welcomed. Some success in improving properties such as heat resistance has been achieved by use of special resin curing agents, but gains by this approach and by special purification of the resins before curing are limited. Changing the basic nature of the epoxy resins by choosing novel chemical structures that contribute intrinsically better properties is a better avenue to improved characteristics.

OBJECTS OF THE INVENTION

It is an object of the present invention to provide new resins containing both epoxy and cyano groups. It is a further object of this invention to provide resins containing epoxy and cyano groups that can be cured to yield useful insoluble, infusible products. These and other objects of the invention will become apparent during the following detailed description of the invention.

STATEMENT OF THE PREFERRED EMBODIMENT

Now, in accordance with this invention, resins containing both epoxide- and cyano-groups are provided having at least two epoxy groups and at least one cyano group per molecule. The new series of epoxy resins possesses a unique combination of properties, particularly good compressive strength and high modulus because of the presence of the cyano groups. It is believed that the cyano groups have a high dipole moment and act by secondary valence forces to reduce the intermolecular slip of resin molecules past adjacent molecules, thereby contributing to improved properties in cured resin structures.

The new resins of this invention comprise those organic materials that have more than one vic-epoxy group, that is, more than one

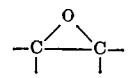

group, which may be in a terminal position, that is, a

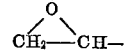

group, or in an internal position, that is, a

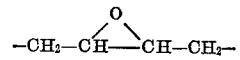

group, as well as one or more cyano groups in each molecule.

Examples of such polyepoxides inclnude, among others, 1,4-diglycidoxy-2,3-dicyanobenzene,
1,4-diglycidoxy-2,6-dicyanobenzene,
1,4-diglycidoxy-2,5-dicyanobenzene,
1,4-diglycidoxy-2,3,5,6-tetracyanobenzene,
1,3,5-triglycidoxy-4-cyanobenzene,
1,4-diglycidoxy-2,3-dicyanonaphthalene and the like.

Other examples of polyepoxides suitable for the present invention are, among others, N,N-diglycidyl-4-cyanoaniline,
N,N,N',N'-tetraglycidyl-2,2'-dicyano-4,4'-methylenedianiline,
N,N-diglycidyl-4-(tricyanovinyl)aniline,
N,N,N',N'-tetraglycidyl-4-cyano-metaphenylenediamine,
N,N,N',N'-tetraglycidyl-2,5-diamino-3,4-dicyanothiophene and the like.

Other examples of suitable polyepoxides are diglycidyl-5-cyanoisophthalate, diglycidyl - 2 - cyanocylopentane-1,4 - dicarboxylate, diglycidyl - 2,3 - dicyanonaphthalene-1,4 - dicarboxylate and the like. The compounds 3-(2,3-epoxybutyl) - 4 - cyanoglycidoxybenzene, diglycidyl - 2-cyano - 4,5 - epoxycyclohexane - cis - 1,2 - dicarboxylate, and the like are also suitable for the practice of the present invention.

A particularly preferred group of the above-described polyepoxy cyano resins are those having glycidoxy, N-glycidyl and carboglycidoxy groups. These may be prepared by reacting the required proportions of cyanophenol or cyanoorganic acid or cyanoamine with excess epichlorohydrin in alkaline medium. The desired alkalinity is obtained by adding basic substances such as sodium or potassium hydroxide, preferably in stoichiometric excess to the epichlorohydrin. The reaction is preferably carried out at the temperatures within the range 50° C. to 150° C. Heating is continued for several hours to complete the reaction, and the product is washed free of salt and base. Subatmospheric, atmospheric or super atmospheric pressures may be employed as desired.

Alternatively, an amine may be converted to a diglycidyl amine by reaction with epichlorohydrin before the cyano group or groups are installed. After recovery and purification of the diglycidyl amine, cyano groups can be inserted in its structure by means known to the art, such as by reaction with tetracyanoethylene.

Alternatively, cyanocarboxylic acids may be converted to their alkali metal salts, which are then reacted with excess epichlorohydrin in the presence of a few percent of a catalyst, such as tetramethylammonium bromide, to yield the desired cyanoepoxy resin. Also, cyanoamines may be used to form resins within the scope of the present invention by reacting them with epichlorohydrin in the presence of acetic acid and tetramethyl ammonium bromide catalysts to produce polychlorohydrins, which are then converted to the desired cyano polyepoxy resins by dehydrochlorination with powdered alkali metal hydroxides, carbonates, aluminates, phosphates and like alkaline salts.

Still other types of cyano epoxy resins may be produced by methods known in the art. A cyano compound containing one or more olefinic or cycloolefinic carbon-carbon double bonds may be treated with peroxy acids, such as peracetic acid, or inorganic peracids or by other oxidative means, to form epoxy groups. A typical resin of this kind is exemplified in the preparation of a triepoxide, for example, diglycidyl-4,5-epoxy-2-cyano-cis-1,2-dicarboxylate, by peracetic acid epoxidation of diglycidyl-2-cyano-cyclohex-4-ene-cis-1,2-dicarboxylate.

The finished resins produced by the above mentioned methods will vary from soft to brittle solids or they may be crystalline solids. The resins of this invention are soluble in solvents such as acetone, toluene, benzene and the like. They are, generally, not heat curable; that is, they cannot be converted to the insoluble, infusible stage by heat alone.

Curable condensates that contain epoxy groups may be prepared, if desired, from the cyano epoxy resins of this invention by reacting the resins with polybasic acids in the presence of catalysts, such as tertiary amine borates, quaternary ammonium salts or organic prosphines. Suitable polybasic acids are polymeric acids, such as dimer and trimer acids from ethylenically unsaturated fatty acids, and the hydrogenated dimer and trimer acids. Suitable catalysts are triethylamine, pyridine, dimethylbenzylamine, methyl borate or trimethylborate derivatives, trimethylammonium salts of inorganic acids, triphenylphosphine and the like. The polybasic acids must be reacted with at least 1.5 times the chemical equivalent of the polyepoxide resin to avoid insoluble, infusible products.

Temperatures during reaction will generally be 50° C. to 150° C. Reaction can be carried out without solvent, or if both reactants are solids, an inert solvent such as benzene or cyclohexane, or cyclohexanone, may be used. The solvent and catalyst may be removed, if desired, by vacuum distillation or by other suitable means.

The condensates made from the cyano epoxides of this invention are valuable in preparing surface coating compositions. The condensate is usually mixed with a diluent for this application, such as a ketone, ester, ether alcohol, chlorinated hydrocarbon or hydrocarbon to obtain a viscosity suitable for spraying, brushing or dipping. The necessary curing agent may be added alone or after solution in a suitable solvent. Satisfactory cures of the coatings are generally obtained at temperatures of 60° C. up to 200° C. The coating compositions may contain suitable conventional additives such as dyes, pigments, stabilizers, plasticizers, fillers, and bodying agents, if desired.

The epoxy groups of the cyano epoxy resins or in the condensates described above may be cured by reaction with typical epoxy curing agents to form insoluble, infusible products. For this purpose, epoxy curing agents that are acidic, neutral or alkaline may be added.

Examples of the curing agents for the cyano epoxy resins and their condensates include, among others, alkalies like sodium or potassium hydroxides; alkali phenoxides like sodium phenoxide; carboxylic acids or anhydrides, such as oxalic acid or phthalic anhydride; dimer or trimer acids derived from unsaturated fatty acids, 1,20-eicosanedioic acid, and the like; Friedel-Crafts metal halides like aluminum chloride, zinc chlorlde, ferric chloride or boron trifluoride as well as complexes thereof with ethers; acid anhydrides, ketones, diazonium salts, etc.; salts, such as zinc fluoborate, magnesium perchlorate and zinc fluosilicate; phosphoric acid and partial esters thereof, including n-butyl orthophosphate, diethyl orthophosphate, and hexaethyl tetraphosphate.

Amino compounds are especially useful as curing agents. Examples are diethylene triamine, triethylene tetramine, dicyandiamide, melamine, pyridine, cyclohexylamine, benzyldimethylamine, benzylamine, diethylaniline, triethanolamine, piperidine, piperazine, N,N-diethyl-1,3-propane diamine, 1,2-diamine-2-methylpropane, 2,3-diamino-2 - methylbutane, 2,4 - diamino-2-methylpentane, 2,4-diamino - 2,6-dimethyloctane, dibutylamine, dinonylamine, distearylamine, diallylamine, dicyclohexylamine, ethylcyclohexylamine, o-tolylnaphthylamine, pyrrolidine, tetrahydropyridine, 2-methylpiperidine, 2,6-dimethylpiperidine, 2,6-diaminopyridine, methaphenylene diamine, and the like; and soluble adducts of amines and polyepoxides and their salts, such as described in U.S. 2,651,589 and U.S. 2,640,037.

Salts of imidazole compounds are also excellent curing agents for the cyano epoxy resins of this invention and for the condensates made from them. Examples of suitable imidazole salts include, among others, the acetate, formate, lactate and phosphate salts of imidazole, benzimidazole and substituted imidazoles. Examples of suitable substituted imidazoles include 2-methylimidazole;
2-ethyl-4-methylimidazole;
2-cyclohexyl-4-methylimidazole;
4-butyl-ethylimidazole;
2-butoxy-4-allylimidazole;
2-carboethoxybutyl-4-methylimidazole;
2-octyl-4-hexylimidazole;
2-methyl-5-ethylimidazole;
2-ethyl-4-phenylimidazole;
2-amino-5-ethylimidazole;
2-ethyl-4-(2-ethylamino)-imidazole;
2-methyl-4-mercaptoethylimidazole;
2-butylacetate-5-methylimidazole;
2,5-chloro-4-ethylimidazole;

and mixtures thereof. Especially preferred are the alkyl-substituted imidazole acetates and lactates wherein the alkyl groups contain not more than 8 carbon atoms each, or mixture thereof, and particularly preferred are 2-ethyl-4 - methylimidazole acetate, 2 - ethyl-4-methylimidazole lactate, 2 - methylimidazole acetate, 2 - methylimidazole lactate and mixtures thereof.

These imidazole salts can be prepared by reacting the imidazole with the acid to form the corresponding amine salt. The components are mixed and heated to 25–150° C. in solvent, if desired. The acid required for these salts may be, in general, any fatty acid or organic dibasic acid.

Preferred imidazole salts are imidazole adipate, imidazole phthalate monohydrate, imidazole acetate, imidazole lactate and salts of substituted imidazole with these same acid radicals.

Mixtures of members of these groups of curing agent may be used when desired. For example, a phosphine and an imidazole salt may be used together as a curing agent, or a combination of a phosphonium halide and an amine, or other combinations and mixtures may be employed, where appropriate, to achieve particular objectives.

Other preferred curing agents are the polycarboxylic acids and acid anhydrides, the primary and second aliphatic, cycloaliphatic and aromatic amines and adducts of these amines and polyepoxides. In addition, urea-formaldehyde, melamine-formaldehyde and phenol-formaldehyde resins can also be used to cure the compositions of the invention, particularly when baked coatings are desired.

Particularly preferred curing agents for the cyano epoxy resins of the present invention are the phenylene diamines, i.e., ortho, meta and paradiaminobenzene, and especially metaphenylenediamine. These polyamines yield cured products having good mechanical properties throughout the range of strengths and resistance to heat required in commercial uses.

The amount of curing agent to be used will vary widely, depending on the particular resin and the particular curing agent selected. In general, the amount of curing agent will range from about 1% to about 200% by weight of the cyano epoxy resin or its condensate. The polyamine curing agents are preferably employed in amounts from 0.5%w. to 50%w. In the case of metaphenylenediamine, where there is a specific reaction with epoxide groups, stoichiometric amounts should be used for best results; that is, the quantity of metaphenylenediamine used should correspond to one amine hydrogen for each epoxy group, so that the amount of amine used will depend on the number of epoxy groups per molecule and the total molecular weight of the resin.

Activators for the curing agents, often referred to as accelerators, or catalysts, are also useful in forming three dimensional polymers from the resins of this invention. These compounds may be added in addition to curing agents described above. The activators may be added in relatively small amounts, preferably 0.1–2% w., compared to the main curing agent, to increase the rate and/ or lower the temperature at which curing occurs. Particularly useful activators for curing the products of this invention are stannous salts of monobasic acids, such as stannous octoate and the like; imidazole salts, such as imidazole lactate and the like; lithium salts, for example lithium benzoate; tertiary amines and tertiary amine borates.

The resins of this invention are especially useful and valuable when cured to insoluble, infusible plastics. A typical, but not limiting, method by which such plastics may be obtained is to produce castings by heating the cyano epoxy resins and the curing agent separately to about 80° C., then combining them and mixing thoroughly at 80° C. with a mechanical stirrer. After degassing at low pressure, for example, at 5 mm. Hg absolute pressure, the mixture is poured into a suitable mold. The temperature of the resin-curing agent mixture in the mold is held at 80–85° C. until gelation occurs, after which the temperature is raised to about 160° C. for 1–10 hours, preferably 4–6 hours. After cooling slowly to room temperature, the bubble-free castings are removed from the mold.

Another important application of the products of this invention is in the preparation of laminates or resinous articles reinforced with fibrous materials. Although it is generally preferred to utilize glass cloth for this purpose, any of the other suitable fibrous materials in sheet form may be employed, such as glass matting, paper, asbestos paper, mica flakes, cotton batts, duck muslin, canvas and the like.

In preparing the laminates "wet lay-up" procedures may be used, or other techniques known to the art may be employed depending on the end use and properties desired. In one method the plies of fabric are stacked with warp threads parallel. Warp and filling threads should be nested, that is, each ply should be laid in a face to face, back to back relationship to adjacent plies. After the fabric has been dried for 30 minutes at 200° C. in a forced draft oven, it is placed on a piece of 500 PT cellophane one ply at a time with a small amount of resin between each ply. Another piece of cellophane is placed on top of this stock and the entrapped air is removed. The entire lay-up, with cellophane, is then cured between 18-gage stainless steel plates in a steam heated hydraulic press. The preferred glass cloth types are Volan A treated S glass cloth and HTS 181 treated S glass cloth. The void content of the laminate should be kept low, less than 5% and preferably less than 1% by volume.

Alternatively, the laminates may be made by impregnating the cloth with a solution of resin and curing agent in a volatile solvent, for example, acetone. The sheets of fibrous material or cloth are impregnated by spreading the resin solution on them, or by dripping or by otherwise immersing them in an impregnant. The solvent is conveniently removed by evaporation and the mixture is cured by heating as noted above.

Another important use of the compositions of this invention is in the production of molded articles. A partially cured molding composition is first prepared by milling together a mixture of resin and curing agent with the customary fillers and mold release agents. Usually the milled mixture is set up so that fusible resin is obtained first. The milled mixture is cooled and then ground up. Molded articles are made therefrom by conversion of the fusible resin to the infusible state using molding machines, such as those for compression or transfer molding. If desired, the fusible, milled mixture may be prepared in preformed pellets and the like.

The following examples illustrate the manner in which the invention may be carried out. The examples are for the purposes of illustration, and the invention is not to be regarded as limited to any of the specific compounds or conditions recited. Unless otherwise specified, parts disclosed in the examples are parts by weight.

EXAMPLE I

The preparation of N,N-diglycidyl-4-(tricyanovinyl) aniline and the cured castings made by contacting it with metaphenylenediamine is described below. The mechanical properties of the cured resin are tabulated below.

N,N-diglycidyl aniline was prepared first by reacting 560 g. (6 moles) of purified aniline with 1112 g. (12 moles) of epichlorohydrin in the presence of 80 g. of acetic acid. The reaction mixture was held for 5 hours at 50–60° C., great care being taken to control the exotherm, and then was held overnight at room temperature to form the dichlorohydrin. The crude product was dehydrochlorinated during 2½ hours at 50° C. by treating it with a slight excess of finely powdered sodium hydroxide suspended in 2 liters of methyl ethyl ketone. The product was 1249 g. of diglycidyl aniline containing 0.87 equivalent of epoxide/100 g., or 93% of theory.

The diglycidyl aniline was alkylated with tetracyanoethylene by reacting 0.80 mole of each of the two compounds in dimethyl formamide solution. The mixture was heated for 10 minutes at 60° C. The reaction mixture was poured into water to isolate 235 g. (92% conversion) of N,N-diglycidyl-4-(tricyanovinyl) aniline containing 0.59 equivalent of epoxide per 100 g., or 90% of theory, and 17.3% w. nitrogen or 95% of theory.

One hundred parts of the tricyano compound was heated to 80° C. and mixed thoroughly by mechanical stirring with 15.4 parts of purified metaphenylenediamine, also heated to 80° C. This is the stoichiometric quantity of curing agent, providing one amine hydrogen atom for each epoxide group. During the five minute mixing period the temperature was held at 80–85° C. The warm mixture was degassed for 5–10 minutes at an absolute pressure of 5 mm. Hg, then poured into a glass mold warmed to 80° C. The mold consisted of two 11 inch by 13 inch Herculite glass plates pretreated with mold release agent. The plates were held face to face with C clamps, but separated by ⅛ inch brass spacers, and ³⁄₁₆ inch thick natural gum rubber tubing was placed between the plates to form a long U-shaped dam.

The filled mold was placed in an oven at 80° C. for two hours until the resin system gelled, and was then transferred to an oven at 160° C. for six hours. The cured, bubble-free casting was then allowed to cool slowly to room temperature.

Test specimens were cut from the cast sheets using an 8000 r.p.m. water-cooled Allison carborundum wheel. Tensile specimens were shaped on a Tensilkut machine. Compression test rods were cast inside ½ inch inside diameter aluminum tubing.

Test methods used are described below. All tests were made on a large, floor model Instron tester at 23° C. and 50% R.H.

(1) Heat distortion temperature was measured on ⅛ thick specimens at 264 p.s.i. fiber stress, using ASTM method D–648–56.

(2) Flexural strength was determined by ASTM method D–790–59T on specimens 4.0 inches long and 0.125 inch thick, at a span of 2 inches and at 0.05 inch per minute crosshead speed of the Instron tester.

(3) Compressive strength was measured using ASTM method D–695–54, using as specimens rods 0.5 inch in diameter and 1.5 inches long, with ends smooth and perpendicular to the long axis of the specimen. Testing was done at 0.5 inch per minute of crosshead motion of the test instrument.

(4) Tensile strength was determined as a ten specimen average by ASTM test D–638–68T, using Type I specimens having dimensions 8½ inches long, 0.750 inch wide and 0.125 inch thick, and conforming to ASTM requirements in other respects. Gage length during the test was 2.00 inches and the distance between grips was 4½ inches. Tensile elongations were measured using a 0.5 Peters model 5-6M-644 microformer extensometer (100/1. magnification).

A comparison of mechanical properties of cured, N,N-diglycidyl-4-(tricyanovinyl) aniline with a cured commercial epoxy resin shown in the following table:

|  | N,N-diglycidyl-4-(tricyanovinyl) aniline | Commercial epoxy resin (diglycidyl ether of Bisphenol A) a |
| --- | --- | --- |
| Resin purity, percent | 96 | 92 |
| Curing agent, phr.b | 15.4 | 14.6 |
| Tensile properties: |  |  |
| Break, p.s.i | 4,900 | 12,900 |
| Modulus, p.s.i.×10⁻⁵ | 7.2 | 4.6 |
| Flexural properties: |  |  |
| Ultimate strength, p.s.i | 18,900 | 20,500 |
| Modulus, p.s.i.×10⁻⁵ | 7.8 | 4.7 |
| Compressive properties: Yield, strength, p.s.i | 36,800 | 18,600 |

ᵃMolecular weight 350, epoxy equivalent 170–200.
ᵇMetaphenylenediamine, 100% stoichiometry.

The data show the excellent compressive yield strength and the good flexural properties of the cured cyanovinyl resin.

EXAMPLE II

The preparation and curing of 2,3-dicyano-1,4-diglycidoxybenzene is described in this experiment.

A 5% molar excess of 50% aqueous potassium hydroxide was added over 20 minutes to an aqueous isopropanol solution of commercial 2,3-dicyanohydroquinone and epichlorohydrin in 1 to 30 molar ratio while holding the temperature at 70–80° C. The mixture was stirred mechanically at his temperature for 40 minutes, then it was washed, and the volatile liquids were stripped off by vacuum distillation. The product was 231 grams (90% conversion) of an amorphous solid having 0.65 equivalent of epoxide per 100 g. (89% of theory). The infrared spectra and neutron magnetic resonance spectra confirmed the structure proposed.

This resin was cured with metaphenylenediamine catalyst to form strong solid castings. The resin was also deposited on glass cloth from dioxane solution and cured by heating. Care must be taken in these operations because of the unusual reactivity of this epoxy resin. Related results to Example I are obtained.

EXAMPLE III

Using the methods described in Examples I and II, a cured casting is prepared from 100 parts of 2,3-dicyano-1,4-diglycidoxybenzene and 1 phr. of boron trifluoride etherate. The two components are mixed mechanically at 80° C., cured and tested. Related results are obtained.

EXAMPLE IV

To 100 parts of N,N-diglycidyl-4-(tricyanovinyl) aniline is added 85 parts of hexahydrophthalic anhydride and 2 parts of 2-ethyl-4-methylimidazole lactate (curing accelerator). After mechanical mixing at 80° C. the mixture is heated for two hours at 90° C., plus four hours at 135° C. The product has properties related to Example I.

EXAMPLE V

Example I is repeated with the exception that the curing agent is replaced with 14 parts of triethylenetetramine. Related results are obtained.

EXAMPLE VI

Example I is repeated but 0.25 part of stannous octoate are also added as a curing accelerator. Related results are obtained.

We claim as our invention:

1. A cyano- and epoxide-containing compound selected from the group consisting of cyano-substituted glycidyl ethers of polyhydric phenols, cyano-substituted N,N-diglycidyl anilines, cyano-substituted N,N,N',N' - tetraglycidyl phenylenediamines and N,N'-diglycidyl tricyanovinyl aniline wherein the cyano-substitution is on the aromatic nucleus.

2. A heat-curable composition comprising (A) a cyano- and epoxide-containing compound selected from the group consisting of cyano-substituted glycidyl ethers of polyhydric phenols, cyano-substituted N,N-diglycidyl anilines, cyano-substituted N,N,N',N' - tetraglycidyl phenylenediamines and N,N'-diglycidyl tricyanovinyl aniline wherein the cyano-substitution is on the aromatic nucleus and (B) an epoxy curing agent.

3. A composition according to claim 2 wherein the epoxy curing agent is used in approximately stoichiometric amounts.

4. A composition according to claim 2 wherein the epoxy curing agent is an amine.

5. A composition according to claim 2 wherein the epoxy curing agent is metaphenylenediamine.

6. A composition according to claim 2 wherein the epoxy curing agent is a polycarboxylic acid anhydride.

7. A composition according to claim 2 wherein the epoxy curing agent is a Lewis acid.

8. A composition according to claim 2 wherein the epoxy curing agent is a $BF_3$ complex.

9. The cured composition of claim 2.

10. A composition according to claim 2 wherein an epoxy curing accelerator is additionally employed.

11. A composition according to claim 10 wherein the epoxy accelerator is a stannous salt of a monocarboxylic acid having five to twenty carbon atoms.

12. A composition according to claim 10 wherein the epoxy curing accelerator is stannous octoate.

13. 2,3-dicyano-1,4-diglycidoxybenzene.
14. N,N-diglycidyl-4-(tricyanovinyl)aniline.

References Cited
UNITED STATES PATENTS

| | | | |
|---|---|---|---|
| 3,183,250 | 5/1965 | Rosenblatt et al. | 260—348 |
| 3,194,819 | 7/1965 | Middleton | 260—348 |
| 3,313,829 | 4/1967 | Rosenblatt et al. | 260—348 |
| 3,368,983 | 2/1968 | Tinsley et al. | 260—2 |
| 3,449,375 | 6/1969 | Newey | 260—348 |
| 3,488,297 | 1/1970 | Aggias | 260—2 |

WILLIAM H. SHORT, Primary Examiner

E. A. NIELSEN, Assistant Examiner

U.S. Cl. X.R.

260—2 EC, 2 N, 2 EA, 18 EP, 47 EP, EC, EA, EN, 348 R